US006649867B2

United States Patent
Rippl et al.

(10) Patent No.: US 6,649,867 B2
(45) Date of Patent: Nov. 18, 2003

(54) BLOWING DEVICE FOR A LASER SYSTEM

(75) Inventors: Peter Rippl, Augsburg (DE); Rudolf Huber, München (DE)

(73) Assignee: Kuka Schweissanlagen GmbH, Augsburg (DE)

( * ) Notice: Subject to any disclaimer, the term of this patent is extended or adjusted under 35 U.S.C. 154(b) by 0 days.

(21) Appl. No.: 10/169,037

(22) PCT Filed: Nov. 29, 2000

(86) PCT No.: PCT/EP00/11928

§ 371 (c)(1),
(2), (4) Date: Jun. 20, 2002

(87) PCT Pub. No.: WO01/45893

PCT Pub. Date: Jun. 28, 2001

(65) Prior Publication Data

US 2002/0195431 A1 Dec. 26, 2002

(30) Foreign Application Priority Data

Dec. 22, 1999 (DE) ................................ 299 22 544 U

(51) Int. Cl.[7] .............................................. B23K 26/00
(52) U.S. Cl. ............................ 219/121.84; 219/121.63; 219/121.67
(58) Field of Search ................. 219/121.84, 121.63, 219/121.67, 121.6

(56) References Cited

U.S. PATENT DOCUMENTS 5,239,552 A * 8/1993 Okuyama et al. ............. 372/58
5,293,023 A * 3/1994 Haruta et al. ............ 219/121.6
5,359,176 A 10/1994 Balliet, Jr. et al.

FOREIGN PATENT DOCUMENTS

| DE | 43 29 322 | 3/1994 |
| DE | 44 35 531 | 4/1995 |
| EP | 0 464 213 | 1/1992 |
| WO | WO 95/03911 | 2/1995 |

* cited by examiner

Primary Examiner—M. Alexandra Elve
(74) Attorney, Agent, or Firm—McGlew and Tuttle, P.C.

(57) ABSTRACT

The invention relates to a blowing device (4) for a laser system (1) used for separating or welding workpieces (17). The blowing device (4) has at least one nozzle assembly (5), which generates a gas stream (7) that is oriented at an angle to the laser beam (3). The blowing device also has an air supply (8) which, on one side of the nozzle, leads into the proximity of the nozzle opening (6) and which is provided for an air supply stream (10) that is fed to the gas stream (7) in an essentially parallel manner or at an apex angle. A second air supply (9) is arranged on the other side of the nozzle. Said second air supply leads into the proximity of the nozzle opening (6) and is provided for a second air supply stream (11) that is fed to the gas steam (7) in an essentially parallel manner or at an apex angle. A protecting glass (13), which is oriented toward the gas stream (7) in an essentially parallel manner, can be alternatively or additionally placed in the proximity of the nozzle opening (6). Said protecting glass is provided in the form of a pane and directly abuts against the nozzle opening (6) in a sealed manner. In the preferred embodiment, the outer cross-section of the nozzle (5) is provided in the shape of a drop or a vane, whereby at least the outer surfaces thereof extending toward the nozzle opening (6) form air conducting surfaces (12).

13 Claims, 2 Drawing Sheets

Figure 3:
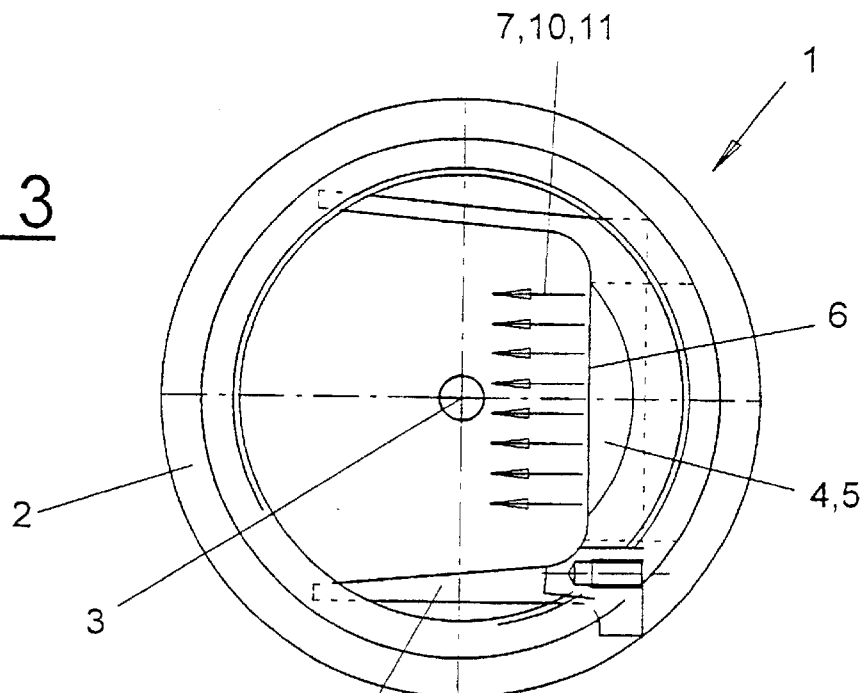

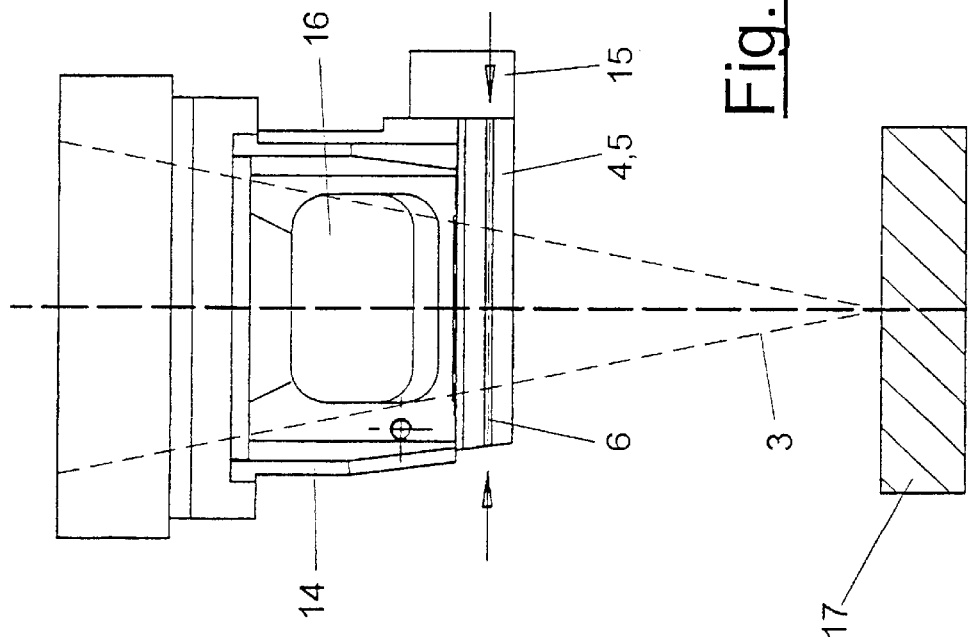
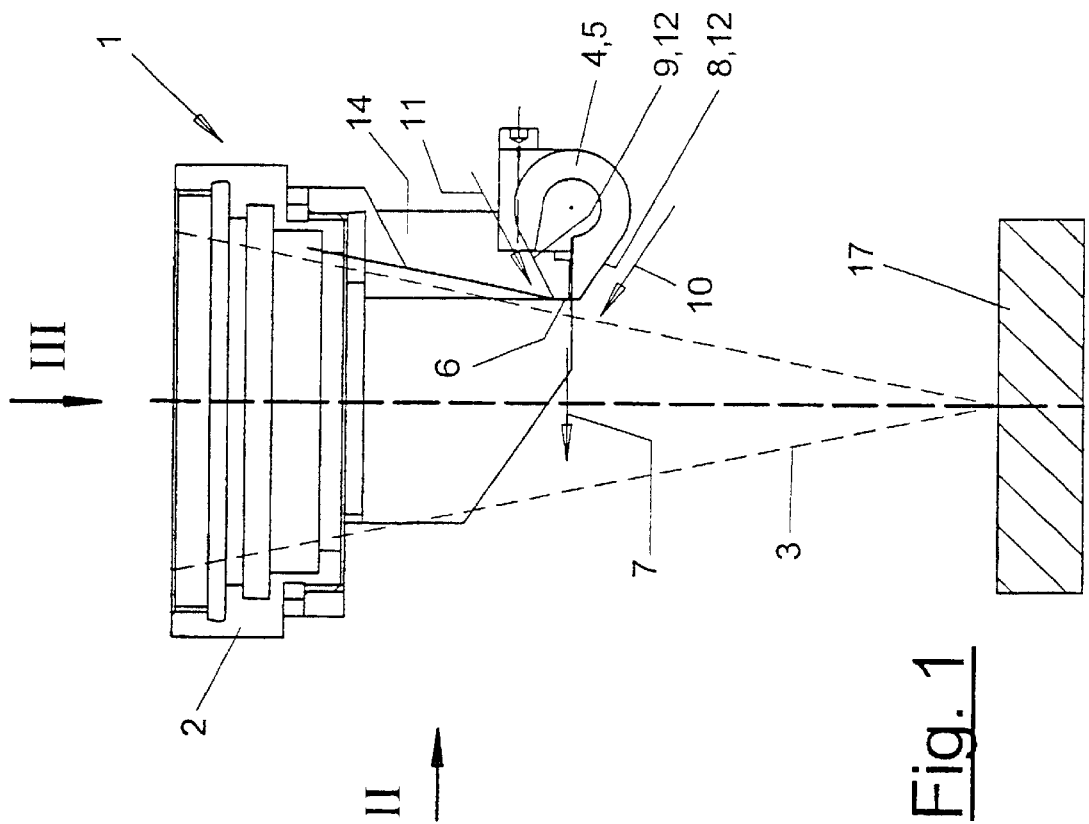

BLOWING DEVICE FOR A LASER SYSTEM

The present invention pertains to a blowing device for a laser means with the features described in the preamble of the principal claim.

Such a blowing device has been known from practice. It may be associated with a laser welding means or a laser cutting means by means of a suitable bracket. The blowing device has an elongated nozzle, which is directed at right angles to the laser beam and generates a gas flow passing through the laser beam. On the underside, the nozzle has an air feed, which opens in the vicinity of the nozzle opening and via which an incoming air flow can be fed to the gas flow at an acute angle. The housing of the laser head joins on the other side of the nozzle.

Thus, an incoming air flow guided essentially in parallel is generated under the gas flow in the prior-art blowing device. An air curtain, which is to protect the laser optical system from contamination or damage by spatters flying up from the melt, shall be formed by the two flows. The prior-art arrangement has the drawback that, on the one hand, it is arranged at a great distance from the welding or cutting site, as a result of which the gas and air flows must cover and protect a relatively large cross section. This requires a very high kinetic flow energy, which can be accomplished only insufficiently because of the diffusor effect and the pressure limited to a maximum of about 2.5 bar. On the other hand, the two flows are not yet sufficiently stable to guarantee an optimal protection from spatters. Furthermore, there are noise problems and there is an unfavorable space requirement.

Another blowing device has been known from DE-A 44 35 531. A gas flow is guided here along a deflecting mirror in the laser optical system. This requires a corresponding design of the laser means. The gas flow also must be curved.

Another blowing device shown in WO 95/03911, which provide closed channel for the gas flow and has a correspondingly complicated design. As a result, the blowing device considerably reduces the freedoms of design and the fields of use of the laser means.

The object of the present invention is to show a better blowing device.

This object is accomplished by the present invention with the features described in the principal claim.

In the blowing device according to the present invention, the gas flow generated by the nozzle arrangement is enclosed and guided on both sides, as a result of which swirling and consequently flow losses are extensively avoided. The kinetic energy and the blowing-away force of the gas flow are preserved, and the outflow pressure, which is limited for physical reasons, is optimally utilized.

The guiding of the gas flow can be accomplished either by two incoming air flows converging at an acute angle or essentially in parallel or by such an incoming air flow and a parallel protective glass. This flow guiding also minimizes the noises. The blowing device has a substantially simpler design and is less expensive than prior-art embodiments. In addition, it may be positioned at any suitable point and it does not have an adverse effect on a possibly existing protective gas feed for the welding process.

In the preferred embodiment, the nozzle is arranged at an open nozzle holder and may also be fastened in a height-adjustable manner. This makes possible the lateral feed of incoming air from the environment and an outside flow around the nozzle, which is also especially advantageous for the flow guiding in conjunction with the drop or wing shape, which is favorable for flow. In addition, the gas and air flow may be placed at a favorable level, at which the scattering or cone cross section is relatively small for protection against spatters, and the existing kinetic energy of the air flow is sufficiently strong for blowing away even larger spatters. In addition, the other components of the laser means are not affected adversely due to the open design and arrangement of the blowing device.

Additional advantageous embodiments of the present invention are described in the subclaims.

Figure 4:
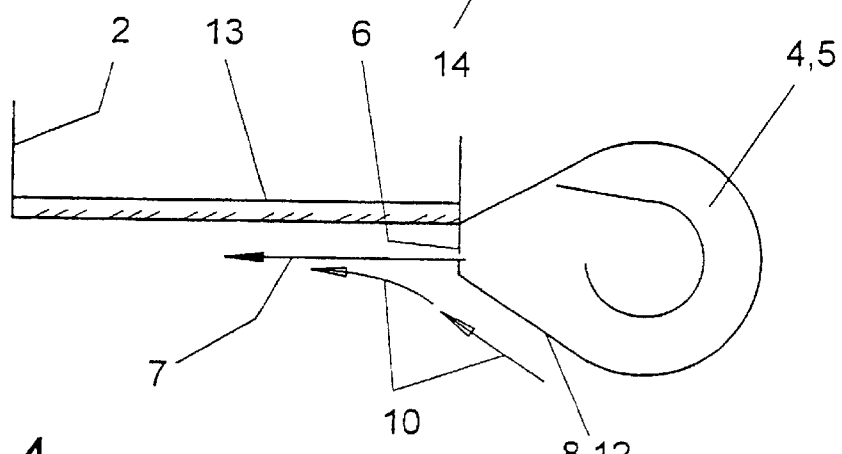
Figure 5:
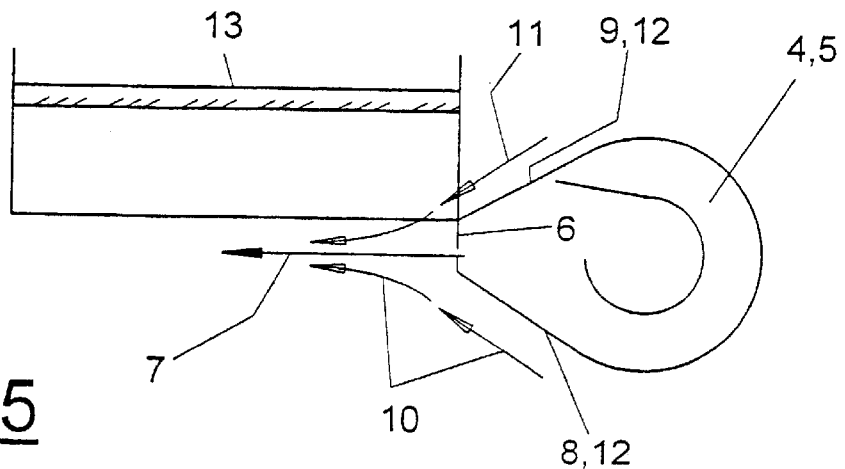

The present invention is schematically represented in the drawings as an example. Specifically, FIG. 1 shows a side view of a laser means with a blowing device, FIG. 2 shows a tilted side view of the arrangements according to FIG. 1 corresponding to arrow II, FIG. 3 shows a top view of the arrangement in FIG. 1 according to arrow III, and FIGS. 4 and 5 show variants of the nozzle arrangement according to FIGS. 1 through 3 with a protective glass.

FIGS. 1 and 2 show in two side views a laser means (1), which is used to weld or cut workpieces (17) shown schematically by means of a laser beam or a bundle of laser beams (3). For clarity's sake, only the laser head (2) and the beam (3) of the laser means (1) are shown. A blowing device (4), which generates a gas flow (7), which is directed essentially at right angles to the laser beam (3) and protects the laser optical system arranged above it from contamination or damage due to weld spatters flying up, smoke or other effects from the welding or cutting process, is arranged at the laser means (1).

The blowing device (4) preferably has at least one nozzle (5), which is designed as a transversely directed nozzle bar and has a longitudinally directed, laterally slot-like nozzle opening (6) for discharging the gas flow (7). Opposite compressed air connections (15), of which only one is shown in FIG. 2, are arranged at the two front ends of the nozzle (5). The compressed air connections (15) on both sides press the gas axially into the hollow interior space of the nozzle (5) with inflow directions directed against one another. As a result blow-off pressure that is extensively constant over the slot length of the nozzle opening (6) is obtained. As an alternative, the compressed air connection may be located only on one front side or in the rear. The gas (7) may be air or any other gas.

The nozzle (5) preferably has a drop-shaped or wing-shaped cross section and is fastened at the laser head (2) at a selectable level by means of an open nozzle holder (14). The nozzle holder (14) has for this purpose, e.g., a window (16) shown in FIG. 2, which makes possible the entry of outside air to the outer surfaces of the nozzle (5), which are located at the top. The nozzle (5) may be held extensively freely floating and may be flown past by the ambient air on the rear side as well as on the underside and the top side, The nozzle holder (14) may have a height-adjustable design or be fasted to the laser head (2) in a height-adjustable manner.

In the embodiment shown in FIGS. 1 through 3, the trapezoidal nozzle (5) has on the outer side two outer walls, which extend obliquely to the nozzle opening (6) and open there and are used for bilateral air feed (8, 9) and for incoming air flows (10, 11) flowing past on both sides. The incoming air flows (10, 11) are drawn in from the ambient outside air by the gas flow (7) being discharged from the nozzle opening (6) under a high pressure of about 2.5 bar.

The incoming air flows (10, 11) reach the nozzle opening (6) at an acute angle and are deflected there in parallel to the gas flow (7). As a result, the two incoming air flows (10, 11) embed the gas flow (7) between them and guide it on both sides. On the whole, this results in a three-layer, essentially laminar flow, which has an especially high flow stability while swirling is extensively avoided. The kinetic energy of the flows is preserved over a rather great length of flow, so that the three-layer flow has sufficient force to blow away ascending spatters, smoke or the like in front of the laser head (2) and the laser optical system arranged there.

FIGS. 4 and 5 show two variants of the embodiment according to FIGS. 1 through 3. In the embodiment according to FIG. 4, only the incoming air flow (10) is present on the underside of the nozzle (5). Instead of the upper incoming air flow (11), a preferably a flat pane-shaped protective glass (13), which is transparent to the laser beam, is located above the gas flow (7), and this protective glass extends in parallel to the said gas flow and it sealingly joins with its edge the nozzle opening (6). As a result, the inflow of the incoming air flow is prevented on this side. The protective glass (13) is fastened in the laser head (2) or at the nozzle holder (14) in a suitable manner. It forms, instead of the upper incoming air flow (11), the upper parallel guide for the gas flow (7), which is embedded and guided as a result between the protective glass pane (13) and the lower incoming air flow (10). The protective glass (13) additionally protects the laser optical system against spatters. It is preferably arranged detachably and can be replaced when necessary.

The same incoming air flows (10, 11) converging conically on both sides toward the nozzle opening (6) are again present in the variant according to FIG. 5 as in FIGS. 1 through 3, and a protective glass (13), which is positioned in the laser head or in the nozzle holder (14) at a spaced location above the nozzle opening (6), is additionally arranged. The protective glass (13) has no guiding function for the gas flow (7) in this case and is used above all as an additional mechanical protection against spatters.

Various modifications of the embodiment shown are possible. On the one hand, the outer shape of the nozzle (5) may be different. The air feeds (8, 9) may also be designed as jacketed flow channels instead of as open guide surfaces (12). Furthermore, two or more nozzles (5) may be present.

LIST OF REFERENCE NUMBERS

1 Laser device
2 laser head
3 laser beam
4 blowing device
5 nozzle, nozzle arrangement
6 nozzle opening, slotted nozzle
7 gas flow
8 air feed
9 air feed
10 incoming air flow, outside air
11 incoming air flow, outside air
12 air guide surface
13 protective glass, protective glass pane
14 nozzle holder
15 compressed air connection
16 window
17 workpiece

What is claimed is:

1. A blowing device with a nozzle holder for mounting on a laser system providing a laser beam, for cutting or welding workpieces, the blowing device comprising:
   at least one nozzle arrangement which generates a gas flow directed at an angle to the laser beam, the nozzle arrangement having a nozzle opening;
   an air feed opening on one side of the nozzle, in the vicinity of said nozzle opening, said air feed opening for an incoming air flow fed in essentially in parallel or at an acute angle to said gas flow;
   one of a protective glass directed essentially in parallel to the gas flow and a second air feed opening in the vicinity of the nozzle opening arranged on the other side of the nozzle, said second air feed opening for a second incoming air flow fed in essentially in parallel or at an acute angle to the said gas flow.

2. A blowing device in accordance with claim 1, wherein said protective glass has a pane-shaped design and is arranged directly adjoining said nozzle opening and in a sealing manner.

3. A blowing device in accordance with claim 1, wherein said nozzle has a drop-shaped or wing-shaped cross section on an outside and has outer surfaces extending toward said nozzle opening to form air guide surfaces.

4. A blowing device in accordance with claim 1, wherein said nozzle is arranged at an open nozzle holder and outside air can flow around said nozzle on both sides.

5. A blowing device in accordance with claim 1, wherein said nozzle is arranged at said nozzle holder in a height-adjustable manner.

6. A blowing device in accordance with claim 1, wherein said nozzle is designed as a nozzle bar and has two opposite compressed air connections on front sides.

7. A blowing device, comprising:
   a nozzle holder for mounting on a laser system providing a laser beam, for cutting or welding workpieces;
   at least one nozzle arrangement connected to said nozzle holder, said nozzle arrangement generating a gas flow directed at an angle to the laser beam, the nozzle arrangement having a nozzle opening;
   an air feed opening on one side of the nozzle, in the vicinity of said nozzle opening, said air feed opening for an incoming air flow fed in essentially in parallel or at an acute angle to said gas flow;
   another protection feature on the other side of the nozzle, the another protection feature being one or more of a protective glass directed essentially in parallel to the gas flow and a second air feed opening in the vicinity of the nozzle opening arranged on the other side of the nozzle, said second air feed opening for a second incoming air flow fed in essentially in parallel or at an acute angle to the said gas flow.

8. A blowing device in accordance with claim 7, wherein said protective glass has a pane-shaped design and is arranged directly adjoining said nozzle opening and in a sealing manner.

9. A blowing device in accordance with claim 7, wherein said nozzle has a drop-shaped or wing-shaped cross section on an outside and has outer surfaces extending toward said nozzle opening to form air guide surfaces.

10. A blowing device in accordance with claim 7, wherein said nozzle is arranged at said nozzle holder, which is open, and outside air can flow around said nozzle on both sides.

11. A blowing device in accordance with claim 7, wherein said nozzle is arranged at said nozzle holder in a height-adjustable manner.

12. A blowing device in accordance with claim 7, wherein said nozzle is designed as a nozzle bar and has two opposite compressed air connections on front sides.

13. A blowing device in accordance with claim 7, wherein said protective glass is arranged spaced from said nozzle opening with said second air feed opening between said nozzle opening and said protective glass.

* * * * *